(12) United States Patent
Cochran et al.

(10) Patent No.: US 8,200,921 B2
(45) Date of Patent: Jun. 12, 2012

(54) DATA SYNCHRONIZATION FOR TWO DATA MIRRORS WITH SIDEFILES

(75) Inventors: Robert A Cochran, Roseville, CA (US); Marcel Duvekot, Rocklin, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1509 days.

(21) Appl. No.: 10/798,962

(22) Filed: Mar. 12, 2004

(65) Prior Publication Data

US 2005/0203972 A1  Sep. 15, 2005

(51) Int. Cl.
*G06F 12/00* (2006.01)

(52) U.S. Cl. .......................... 711/162; 707/644

(58) Field of Classification Search ................... 711/162; 707/644
See application file for complete search history.

(56) References Cited

U.S. PATENT DOCUMENTS

| | | | |
|---|---|---|---|
| 5,241,669 A * | 8/1993 | Cohn et al. ................... 714/1 |
| 6,098,179 A * | 8/2000 | Harter, Jr. ................... 714/4 |
| 6,260,125 B1 * | 7/2001 | McDowell .................... 711/162 |
| 6,484,187 B1 * | 11/2002 | Kern et al. .................... 707/204 |
| 6,842,825 B2 * | 1/2005 | Geiner et al. ................. 711/133 |
| 6,912,483 B2 * | 6/2005 | Frederick ...................... 702/187 |
| 2002/0083281 A1 * | 6/2002 | Carteau ........................ 711/161 |
| 2003/0191916 A1 * | 10/2003 | McBrearty et al. ............ 711/162 |
| 2004/0230859 A1 * | 11/2004 | Cochran et al. .................. 714/2 |
| 2005/0038968 A1 * | 2/2005 | Iwamura et al. ............... 711/162 |
| 2005/0102553 A1 * | 5/2005 | Cochran et al. .................. 714/6 |
| 2005/0193179 A1 * | 9/2005 | Cochran et al. ............... 711/162 |

* cited by examiner

*Primary Examiner* — Matthew Bradley (57) ABSTRACT

A data synchronization method (for a redundant data storage arrangement in which there are at least a primary storage entity and mirroring first and second remote storage entities in communication therewith, respectively, writes to the first and second remote storage entities being tracked via respective first and second sidefiles, the first and second storage entities having different levels of write-currency relative to each other) may include: comparing the first sidefile with the second sidefile; and updating writes stored at the second remote storage entity based upon the comparison of the first and second sidefiles.

28 Claims, 6 Drawing Sheets

| Write_Where (Track, Sector) | Write_What (data) | Seq_Num (value) | ACK by 2nd Rem Stor (value) | ACK by 1st Rem Stor RE receipt of fwd'd ACK from 2nd Rem Stor (value) |
|---|---|---|---|---|
| 3, 200 | 010... | 1 | 1 | 1 |
| 5, 126 | 100... | 2 | 1 | 1 |
| 13, 500 | 111... | 3 | 1 | 1 |
| 2, 096 | 001... | 4 | 0 | 0 |
| 10, 312 | 110... | 5 | 1 | 0 |
| 16, 821 | 101... | 6 | 0 | 0 |
| 42 | 44 | 46 | 47 | 48 |

FIG. 2B (22)

| Write_Where (Track, Sector) | Write_What (data) | Seq_Num (value) | Rx'd fwd'd ACK from 2nd Rem Stor (value) |
|---|---|---|---|
| 3, 200 | 010... | 1 | 1 |
| 5, 126 | 100... | 2 | 1 |
| 13, 500 | 111... | 3 | 1 |
| 2, 096 | 001... | 4 | 0 |
| 10, 312 | 110... | 5 | 0 |
| 16, 821 | 101... | 6 | 0 |
| 52 | 54 | 56 | 58 |

FIG. 2C (32)

| Write_Where (Track, Sector) | Write_What (data) | Seq_Num (value) |
|---|---|---|
| 3, 200 | 010... | 1 |
| 5, 126 | 100... | 2 |
| 13, 500 | 111... | 3 |
| 10, 312 | 001... | 5 |
| 62 | 64 | 66 |

DATA SYNCHRONIZATION FOR TWO DATA MIRRORS WITH SIDEFILES

BACKGROUND OF THE INVENTION

It is common practice in many industries to provide a backup data storage entity. In critical applications and industries, host entities often have multiple data storage entities coupled through a controller to a computer and operated in a mirrored (also known as shadowed) configuration. In a mirrored configuration, data storage entities are treated as pairs, and all data intended for a particular data storage device is duplicated on a block-for-block basis on the paired "mirrored" data storage entity. Mirroring can be accomplished by special circuitry or by computer program control, or a combination thereof.

One type of mirroring architecture is asynchronous mirroring. Using asynchronous mirroring, once a write command (hereafter referred to as a "write") is received at a primary storage entity, a completion acknowledgment is sent directly back to an originating host entity to indicate that a subsequent write may be sent. However, this acknowledgment may not necessarily indicate that the write was received at (or even yet transmitted to) a remote storage entity. Instead, if the write is placed in the buffer of the primary storage entity, then the write is issued a sequence number indicating its position in relation to the other writes stored in the buffer. Subsequently, the write can be forwarded to the remote storage entity.

Another type of mirroring is synchronous mirroring. In contrast to asynchronous mirroring, a synchronous mirror primary storage entity delays sending acknowledgement (of having completed a write from the host entity) until the primary storage entity has received acknowledgement that the secondary storage entity has completed the write (that the primary storage entity had forwarded). Relative to asynchronous mirroring, synchronous mirroring delays the host from sending a second write until two storage entities (instead of merely one) in the chain have actually received a first write.

Figure 6:
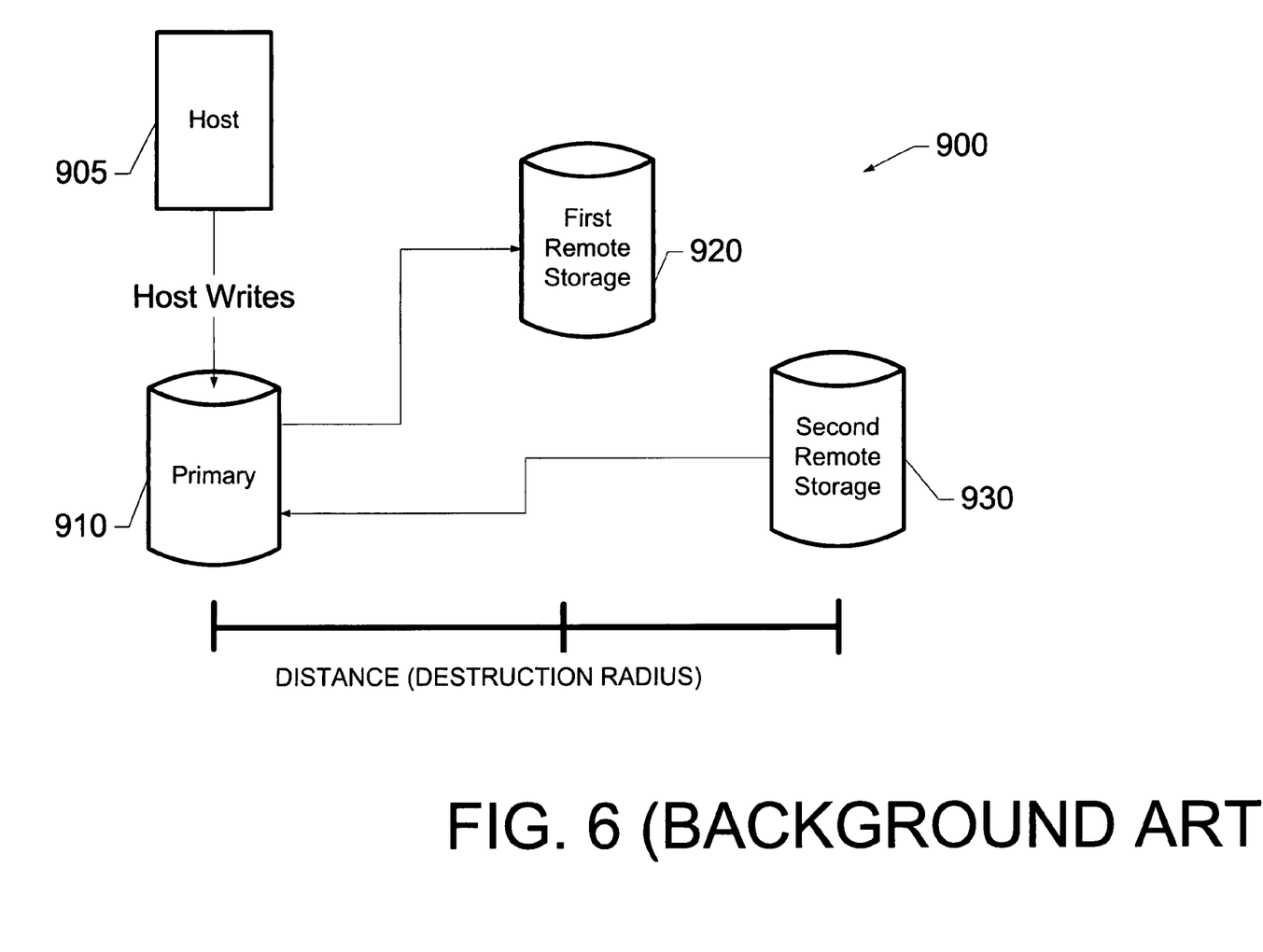
FIG. 6 is a block diagram illustrating a redundant data storage arrangement according to the Background Art.

FIG. 6 illustrates a redundant data storage arrangement 900 according to the Background Art. Arrangement 900 includes a host 905 that can send writes to a primary storage entity 910 (hereafter, primary storage 910), which is configured to mirror the data originating on host 905. Also included in arrangement 900 are a first remote storage entity 920 (hereafter first remote storage 920) and a second remote storage entity 930 (hereafter, second remote storage 930) located significantly farther away from host 905 than is first remote storage 920. Typically, primary storage 910 synchronously forwards writes to first remote storage 920 and asynchronously forwards writes to second remote storage 930. As such, primary storage 910 and first remote storage 920 together operate as synchronous mirrors of the data originating on host 905.

Due to differences in distances from primary storage 910, and differences in communication path media and synchronous versus asynchronous communication considerations (asynchronous being opportunistic in terms of forwarding writes), second remote storage 930 typically is not write current relative to first remote storage 920. In other words, typically, first remote storage 920 has received forwarded writes that have not yet been forwarded to second remote storage 930.

If primary storage 910 were to fail, first remote storage 920 would take over the role previously fulfilled by primary storage 910. But before first remote storage 920 could begin forwarding, asynchronously, writes to second remote storage 930, it would be necessary to make second remote storage 930 write-current. First remote storage 920 does not know how far behind second remote storage 930 is in terms of write-currency. As a result, an out-of-order (OOO) full copy of the data on first remote storage 920 must be made to second remote storage 930, which can take a long time depending upon the distance and communication media. Plus, during (or, in other words, before the completion of) the full copy, the application program resident on host 905 (or its clustered host local to 920) is vulnerable to first remote storage 920 failing, which would leave no usable data on second remote storage 930 because an OOO full data only yields usable data upon completion.

SUMMARY OF THE INVENTION

At least one embodiment of the present invention provides a data synchronization method for a redundant data storage arrangement in which there are at least a primary storage entity and mirroring first and second remote storage entities in communication therewith, respectively, writes to the first and second remote storage entities being tracked via respective first and second sidefiles, the first and second storage entities having different levels of write-currency relative to each other. Such a method may include: comparing the first sidefile with the second sidefile; and updating writes stored at the second remote storage entity based upon the comparison of the first and second sidefiles.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention.

DETAILED DESCRIPTION OF THE PREFERRED EMBODIMENTS

Figure 1:
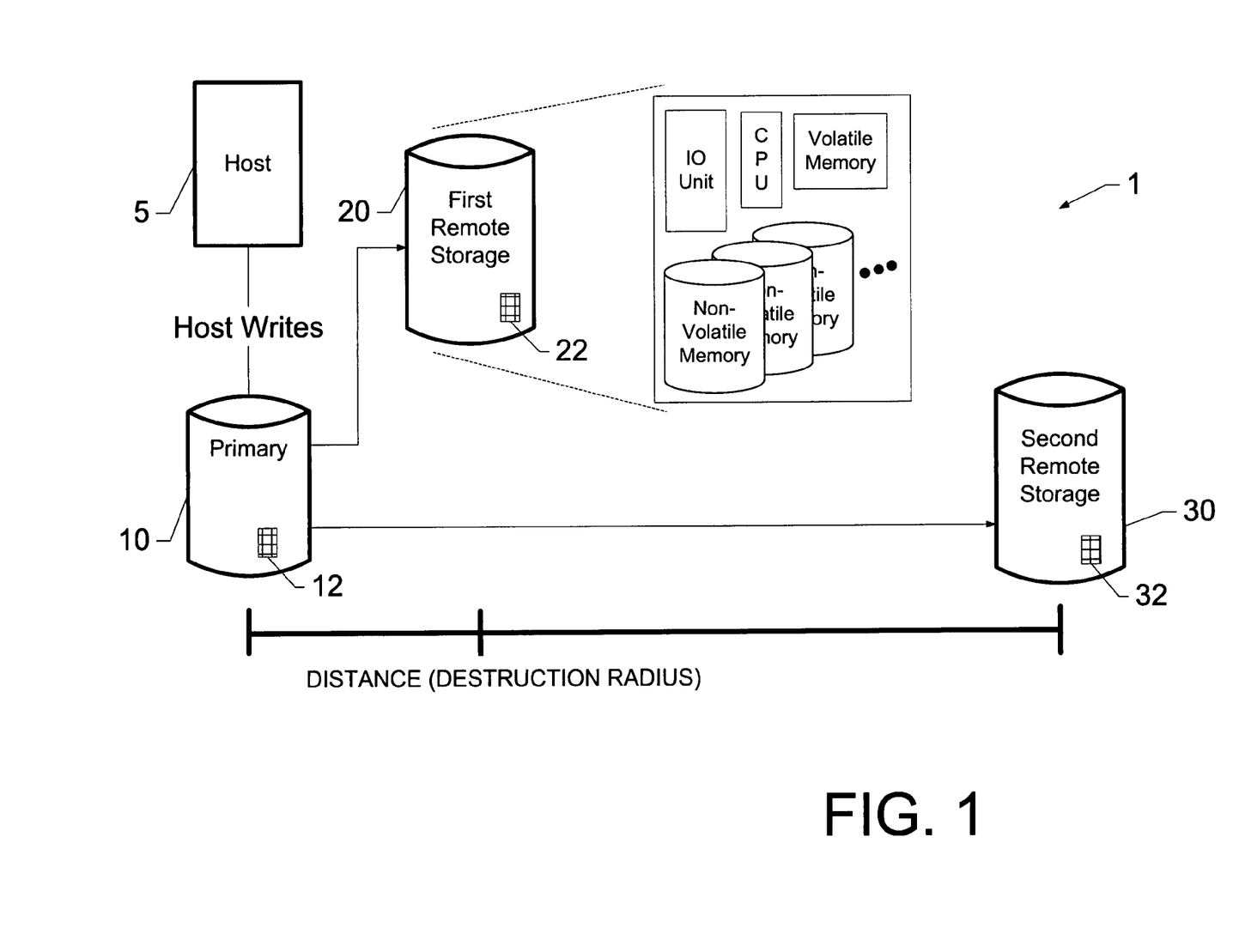
FIG. 1 is a block diagram illustrating a redundant data storage arrangement according to at least one embodiment of the present invention.

FIG. 1 illustrates a redundant data storage arrangement 1 in accordance with at least one embodiment of the present invention. Arrangement 1 includes a source of data that is to be mirrored, e.g., a host entity, 5 (hereafter, host 5) in communication with a primary storage entity 10 (hereafter, primary storage 10). Host 5 may be an application server located a moderate distance (e.g., up to 10 kilometers) from primary storage 10, or alternatively, host 5 may be local to (e.g., onsite with) primary storage 10. Primary storage 10, as its name implies, is the storage entity upon which host 5 stores its data.

Primary storage 10, as described herein, is a storage medium device. In particular, primary storage 10 may be a disk array, optical disk storage apparatus, a layered memory scheme, and/or a distributed but cohesively controlled computing network with storage capabilities. Communication between host 5 and primary storage 10 may be accomplished either via wire-line, optical link or wireless technology, or by way of any other conventional technology by which communications may be accomplished. Moreover, although FIG. 1 illustrates a unidirectional communication stream originating from host 5 to primary storage 10, it is also envisioned that the communication stream may be bidirectional. Additionally, although FIG. 1 illustrates the communication between host 5 and primary storage 10 as being direct, certainly, indirect communication may be used. For example, host 5 may send a data write command (hereafter, a write) to primary storage 10 using intermediary routers, servers, hubs, or the like. Likewise, the other communication connections discussed below may be direct or indirect as needed.

Arrangement 1 further includes a first remote storage entity 20 (hereafter first remote storage 20) and a second remote storage entity 30 (hereafter second remote storage 30), each of which is in communication with primary storage 10. Second remote storage 30 is typically more remote (or, in other words, is located farther away) from primary storage 10 than first remote storage 20. This increases the magnitude of the destruction radius (measured from primary storage 10) necessary to knock out all three storages 10, 20 and 30. Stated differently, this reduces the chance that all three storages 10, 20 and 30 could be knocked out by the same disaster, hence improving data accessibility.

First remote storage 20 and second remote storage 30 each operate as storage mirrors of the data on primary storage 10. In other words, host 5 does not directly store data on either of first and second remote storages 20 and 30, hence neither is considered to be a primary storage entity. First remote storage 20 is arranged to synchronously receive writes from host 5 via primary storage 10. Second remote storage 30 is arranged to asynchronously receive buffered writes from host 5 via primary storage 10.

Similar to primary storage 10, first remote storage 20 and second remote storage 30 are data storage devices. Therefore, both first remote storage 20 and second remote storage 30 may be of varying data storage medium types. In particular, each of first remote storage 20 and second remote storage 30 may be a disk array, optical disk storage, etc. However, first remote storage 20 and second remote storage 30 may or may not be the same storage medium type. As an example, first remote storage 20 may be a disk array where second remote storage 30 is an optical disk storage device; however, if both sites (20, 30) are disk arrays, an application will have the ability to continue read/write operations at the closest of two potential recovery sites, depending on the destruction radius of the disaster.

Hardware components of a storage entity, in general, are known. Hence, for simplicity, an exploded view of only one storage entity, e.g., first remote storage 20 is provided in FIG. 1. The exploded view shows typical hardware components for first remote storage 20, which include a CPU/controller, an I/O unit, volatile memory such as RAM and non-volatile memory media such disk drives and/or tape drives, ROM, flash memory, etc.

Primary storage 10 includes a sidefile 12. First remote storage 20 includes a sidefile 22, which will be explained in detail hereinafter. And second remote storage 30 includes a sidefile 32.

Writes are typically stored in and deleted from sidefiles 12, 22 and 32 in a circular fashion, namely the oldest (no longer needed, contiguous) write in the sidefile is overwritten with the newest/youngest write. Sidefiles 12, 22 and 32 may be embodied in any conventional software code running on storages 10, 20 and 30, respectively. Of course, such conventional software code may include various code segments for implementing sidefiles 12, 22 and 32. Alternatively, sidefiles 12, 22 and 32 may be implemented using hardware that forms a part of storages 10, 20 and 30. Such hardware is known to artisans skilled in relevant arts.

Operationally, host 5 sends data to primary storage 10 for redundant storage therein. Subsequently, primary storage 10 sends data to both first remote storage 20 and second remote storage 30. This establishes two additional redundant storage locations. As seen in FIG. 1, first remote storage 20 is in closer proximity to primary storage 10 than is second remote storage 30. Therefore, necessarily due to different latencies (or, in other words, propagation delays) experienced by a forwarded write as it traverses the different distances to first and second remote storages 20 and 30, and due to the differences in currency of writes dictated by synchronous communication to first remote storage 10 versus buffered asynchronous communication to second remote storage 20, a write sent from primary storage 10 will reach first remote storage 20 before it reaches second remote storage 30. In particular, asynchronous replication is opportunistic in terms of permitting primary storage 10 to buffer the writes and forward them to second remote storage 30 at times when higher priority activities do not otherwise occupy primary storage 10. Therefore, at any given time while writes are being forwarded from primary storage 10, second remote storage 30 will be behind (or, in other words, will be less current) in writes as compared to first remote storage 20.

Propagation delay is a measure of time required for data (e.g., a write) to propagate from one end of a communication medium to other. Such delay is typically measured in nanoseconds (nS). The typical delay for a conventional communication medium is a bit less than 5 nS per meter of medium. So a 1000 meter cable might have a delay of 5000 nS. Therefore, for example, if second remote storage 30 is 1000 meters farther away from primary storage 10 than is first remote storage 20, then (even under ideal conditions) second remote storage 30 may receive a write from primary storage 10 a latency of 5000 nS after the write is received by first remote storage 20.

Propagation delay may also be affected by the overall communications capability of the connection media. For example, generally coaxial cable has a higher propagation delay than fiber optic cable. Therefore, if the communication medium used between primary storage 10 and second remote storage 30 is more robust (induces less delay) than the communication medium used between primary storage 10 and first remote storage 20, the overall propagation delay associated with receiving data at second remote storage 30 may be reduced and/or eliminated. However, cost considerations may preclude implementation of a more robust communication medium between primary storage 10 and second remote storage 30 to compensate for delay; therefore, such propagation delay may be unavoidable. Even with theoretically identical propagation delays, the opportunistic forwarding nature of the asynchronous communications to second remote storage 30 would still render its contents less current than the contents of first remote storage 20.

As discussed earlier, storages 10, 20 and 30 include sidefiles 12, 22 and 32, respectively. Sidefiles 22 and 32 are used to track writes at a storage location from either another storage location or a host location. In arrangement 1, sidefile 22 is used to track and sort (according to chronological order) writes forwarded from primary storage 10, and sidefile 32 similarly tracks and sorts data writes forwarded from primary storage 10. Sidefile 12 is used to track writes from host 5. Due to the nature of synchronous communication, a version of sidefile 22 corresponding to sidefile 33 (namely, a version without field 58) would normally be of no use, however, at least one embodiment of the present invention maintains sidefile 22, e.g., for the purpose of precisely identifying differences in writes received by remote storages 20 and 30 in the event that primary storage 10 is rendered inoperative.

Writes forwarded by primary storage 10 to second remote storage 30 can get lost, e.g., because of a temporary disruption of a part of the path/connection during the forwarding of the write. This can introduce a situation in which second remote storage 30 has received a set of writes that are out of order. Again, asynchronous forwarding permits primary storage 10 to forward a second write to second remote storage 30 before second remote storage 30 sends an acknowledgement of having received the first write forwarded by primary storage 10. Suppose primary storage 10 forwards five writes and that one of them (e.g., the fourth forwarded write) is lost to due a temporary path disruption. The result would be that second remote storage 30 would have the first through third and fifth writes in sidefile 32. Assigning unique sequence numbers to the writes facilitates easy identification of the missing write at second remote storage 32.

Here, primary storage 10 introduces the need for sequence numbers because primary storage 10 is the entity that forwards the writes asynchronously. Hence primary storage 10 is responsible for generating the sequence numbers and uniquely assigning them to writes. A sequence number is included as part of the meta data associated with a write. The existence of the sequence numbers also permits the second remote storage 30 to implement the writes in the correct order (once the older write arrives, assuming that there are no intervening writes yet to have been received).

For example, if sidefile 32 has sequence numbers 1-3 and 5, then second remote storage 30 can implement the writes corresponding to sequence numbers 1-3. But second remote storage 30 would defer implementing the write corresponding to sequence number 5 until it has received the write corresponding to sequence number 4.

Second remote storage 30 can fall behind first remote storage 20, as noted, in terms of writes received. Tracking the writes received and their corresponding sequence numbers in sidefile 22 of first remote storage 20 provides a basis for easily assessing the write-currency difference between second remote storage 30 and first remote storage 20 by comparing the maximum (or, in other words, the oldest) contiguous sequence number in each of sidefiles 22 and 32. Recalling the earlier example where sidefile 32 had sequence numbers 1-3 and 5, the nature of synchronous mirroring of first remote storage 20 permits an assumption that sidefile 22 has sequence numbers 1-5. Hence, if second remote storage 30 needed to be made write-current relative to first remote storage 20, then it would merely be necessary to forward the write corresponding to sequence number 4 to second remote storage 30. Alternatively, first remote storage 20 could forward all writes younger than the oldest contiguous write in second remote storage 30, which would correspond to sequence numbers 4-5 in the example. To deal with the possibility of receiving a duplicate write, second remote storage 30 could correspondingly be configured to discard writes corresponding to sequence numbers that it has, which in the example would mean discarding the write corresponding to sequence number 5.

Figures 2A, 2B, 2C:
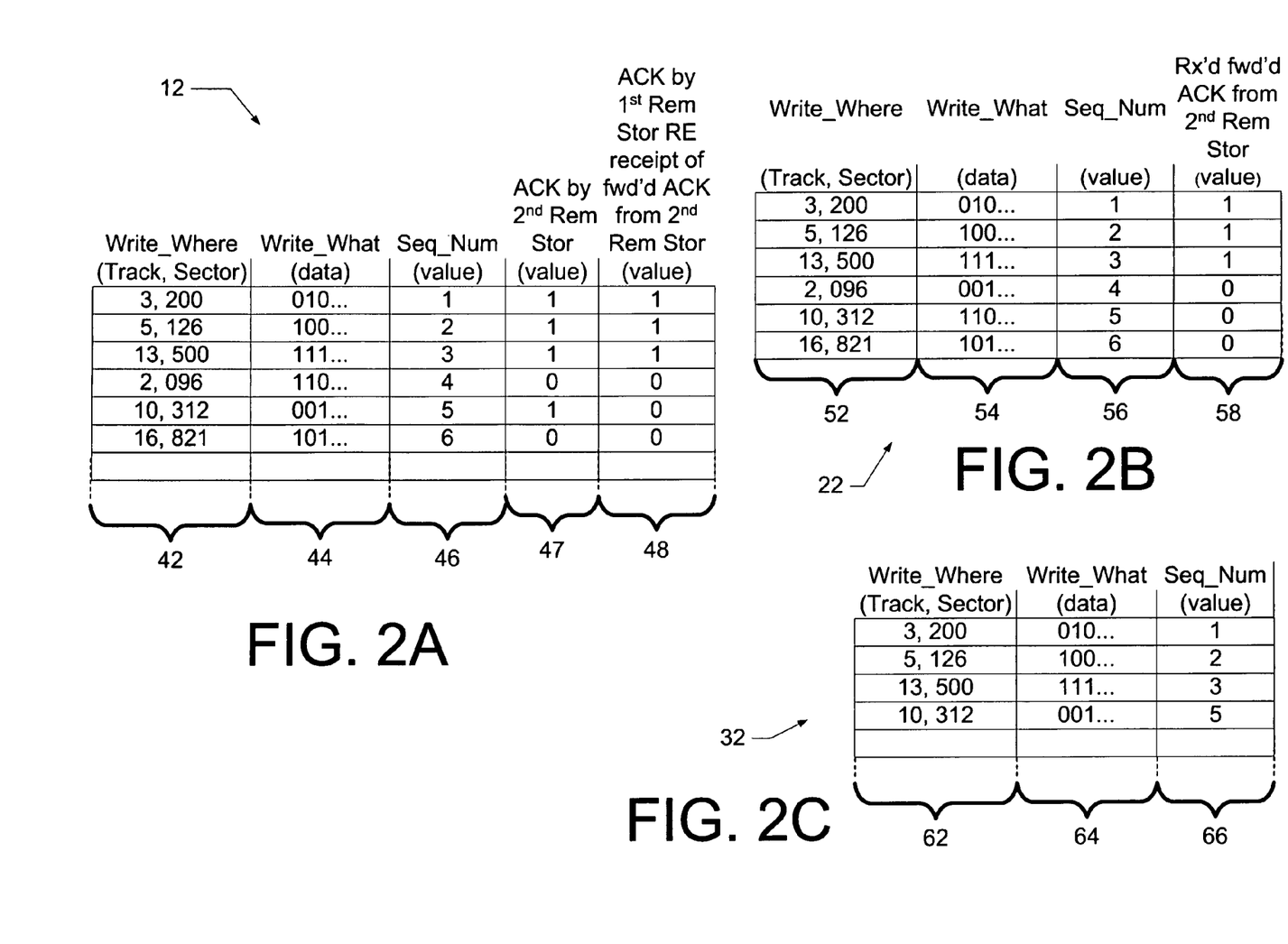
FIGS. 2A, 2B and 2C each illustrate a sidefile, respectively, according to at least one embodiment of the present invention.

FIGS. 2A, 2B and 2C illustrate examples of sidefiles 12, 22 and 32 according to at least one embodiment of present invention. Sidefile 12 is an object or application associated with primary storage 10. Sidefile 22 is an object or application associated with first remote storage 20. Sidefile 32 is an object or application associated with second remote storage 30.

As is illustrated in FIG. 2C, sidefile 32 includes a Write_Where field 62, a Write_What field 64 and a Seq_Num field 66. Contents of Write_Where field 62 indicate one or more locations, e.g., LU (logical unit) and track & sector information, on the storage media where the respective writes are to take place. Contents of Write_What field 64 indicate data being buffered that corresponds to respective track and sector information in Write_Where field 42. Contents of Seq_Num field 66 indicate sequence numbers associated with the respective data listed in Write_What field 62 and track & sector information listed in Write_Where field 64. A sidefile such as sidefile 32 is known.

As is illustrated in FIG. 2A, sidefile 12 includes fields 42-44 corresponding to fields 62-64, plus fields 47 and 48. The contents of field 47 represent an indication of whether an acknowledgement (ACK) has been received from second storage 30. For example, a logical value of one can indicate that the ACK has been received, while a logical value of zero can indicate that the ACK has not been received. In the context of the specific values illustrated in the example of FIG. 2A, primary storage 10 has received ACKs for sequence numbers 1-3 from second remote storage 30.

As will be discussed further below, primary storage 10 forwards the ACKs from second remote storage 30 to first remote storage 20. The contents of field 48 in sidefile 12 represent an indication of whether first remote storage 20 has acknowledged receipt of the corresponding forwarded ACK. Similarly, a logical value of one can indicate that the ACK has been received, while a logical value of zero can indicate that the ACK has not been received. In the context of the specific values illustrated in the example of FIG. 2A, primary storage 10 has received ACKs from first remote storage 20 that it has received the forwarded ACKs for sequence numbers 1-3.

As is illustrated in FIG. 2B, sidefile 22 includes fields 52-54 corresponding to fields 62-64 and 42-44, plus a field 58 corresponding to field 48. The contents of field 58 represent an indication of whether a forwarded ACK (from second remote storage 30 by way of primary storage 10) has been received. Similarly, a logical value of one can indicate that the forwarded ACK has been received, while a logical value of zero can indicate that the forwarded ACK has not been received. In the context of the specific values illustrated in the example of FIG. 2B, first remote storage 20 has received forwarded ACKs for sequence numbers 1-3 from second remote storage 30.

It should be noted that sidefile 32 is depicted as containing fewer field entries than sidefile 22. This, again, can be due to the difference in the distances of first remote storage 20 and second remote storage 30 from primary storage 10 (propagation delay), the buffered asynchronous communication to site B, the temporary disruption of communication during the forwarding of a particular write, etc.

Figure 3:
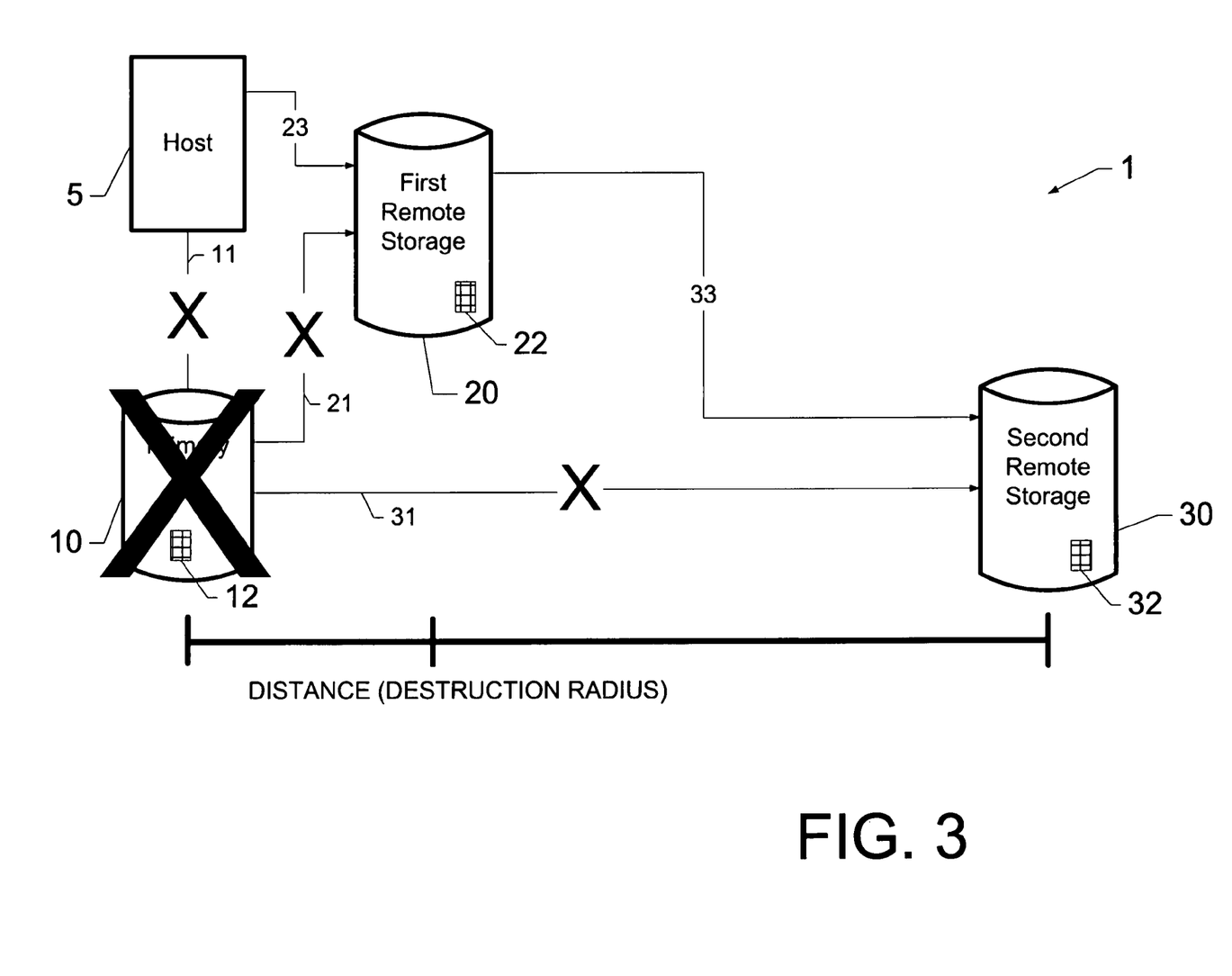
FIG. 3 is a block diagram relating to the arrangement of FIG. 1 for a situation in which the primary storage has been rendered inoperative, according to at least one embodiment of the present invention.

FIG. 3 illustrates at least one embodiment of the present invention as it relates to arrangement 1 for a situation in which primary storage 10 has been rendered inoperative (as indicated by the X superimposed thereon). In other words, primary storage 10 is no longer capable of receiving information from host 5 (as indicated by the X superimposed on path/connection 11), or capable of sending information to either first remote storage 20 (as indicated by the X superimposed on path/connection 21) or second remote storage 30 (as indicated by the X superimposed on path/connection 31). In such a situation and in accordance with at least one embodiment of present invention, first remote storage 20 establishes communication (via path/connection 33) directly (as contrasted with indirectly, where there is at least one intervening storage entity) with second remote storage 30. Also, host 5 (or its local cluster equivalent) establishes communication (via path/connection 23) directly with first remote storage 20.

First remote storage 20 now takes on the role previously performed by primary storage 10. Second remote storage 30 can now receive writes from host 5 that are forwarded via first remote storage 20 if second remote storage 30 is made write-current relative to first remote storage 20. As mentioned above, such a write-update is based upon the comparison of sequence numbers in sidefiles 22 and 32. In contrast, the Background Art of FIG. 6 in a similar situation must perform a full copy of all data on first remote storage 920 to make second remote storage 930 write-current relative to first remote storage 920.

In more detail, once first remote storage 20 establishes communication with second remote storage 30, first remote storage 20 conducts a comparison of sidefile 22 with sidefile 32. Alternatively, once communication between first remote storage 20 and second remote storage 30 is established, second remote storage 30 can conduct the comparison of sidefiles 22 and 32. In particular, the comparison is made between the maximum contiguous (e.g. non-interrupted) sequence numbers in fields 56 and 66.

The following discussion of contiguous sequence numbers assumes that sequence numbers are positive integers that increase in magnitude such that the age of a sequence number is inversely proportional to its magnitude, e.g., sequence number 2 is older than sequence number 4 (and further assuming a situation that does not involve integer roll-over). The maximum contiguous sequence number in a sidefile is not necessarily the absolute newest (largest) sequence number in the sidefile, rather it is the maximum newest (largest) sequence number for which no intervening sequence numbers are missing between it and the newest (largest) sequence number. In terms of the example field values illustrated for sidefile 32 in FIG. 2C, the absolute oldest sequence number is 1 while the maximum contiguous sequence number is 3. In comparison (in terms of the example field values illustrated for sidefile 22 in FIG. 2B), the maximum contiguous sequence number in sidefile 22 is 5.

The synchronous forwarding of writes to first remote storage 20 typically creates a circumstance in which the maximum contiguous sequence number in field 66 will be greater (newer) than the maximum contiguous sequence number in field 56. Based upon this determination, first remote storage 20 forwards to second remote storage 30 the writes corresponding to the sequence numbers in sidefile 22 that are (1) greater than the maximum contiguous sequence number in second remote storage 30 and (2) missing from sidefile 32. In terms of the example values listed in FIGS. 2B-2C, sequence number 4 (or, alternatively, the writes corresponding to sequence numbers 4-5, as noted above), and its associated data are forwarded in order to make second remote storage 30 write-current relative to first remote storage 20. After the update is complete, the data in sidefiles 12, 22 and 32 can be purged.

The specific values illustrated in the fields of sidefiles 22 and 32 are meant to be illustrative of at least one embodiment of present invention only. Therefore, various alterations to the structure of sidefiles 22 and 32 and different values in the fields thereof are expected as varying implementation circumstances dictate. In particular, sidefiles 22 and 32 may be designed to handle additional or uniquely different information as that illustrated in the figures. For example, instead of listing specific track and sector information in Write_Where fields 42 and 52, these fields could be modified to list instead pointer information related to data that is the subject of a write. This is only one such modification to sidefiles 22 and 32 that a skilled artisan in relevant arts would appreciate.

Figure 4:
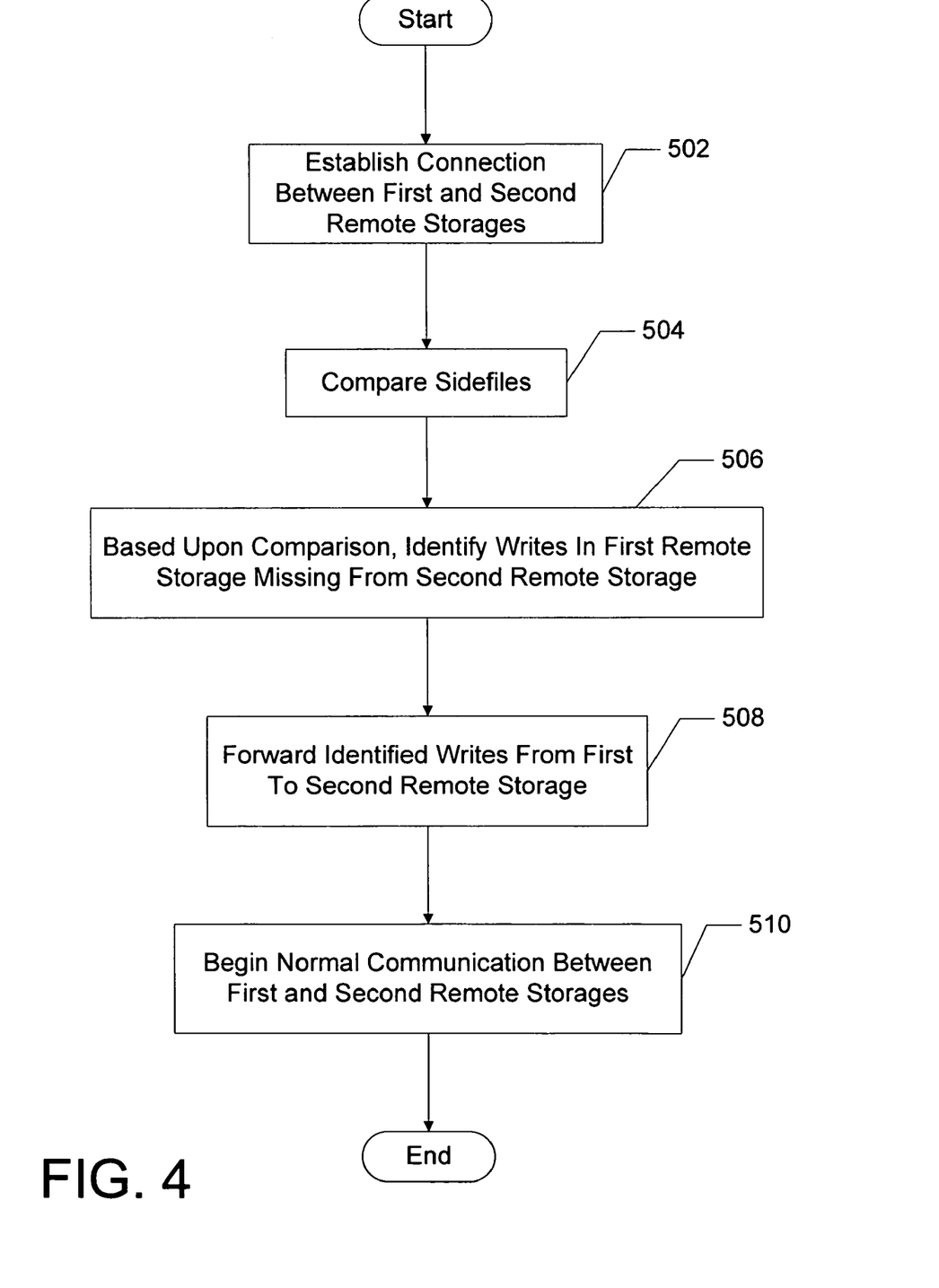
FIG. 4 is a flowchart illustrating a method of ensuring proper storage redundancy in accordance with at least one embodiment of the present invention.

FIG. 4 is a flowchart illustrating a method for updating data at second remote storage 30 in accordance with at least one embodiment of the present invention. Flow begins at block 502, where connection 33 is established between first remote storage 20 and second remote storage 30. Next at block 504, sidefile 22 is compared with sidefile 32. Next at block 506, based upon the comparison between sidefiles 22 and 32, it is identified which writes need to be sent from first remote storage 20 to second remote storage 30 in order to make second remote storage 30 write-current relative to first remote storage 20. As noted above, the comparison is conducted by first remote storage 20, but it is well within the scope of at least one embodiment of the present information for second remote storage 30 alternatively to conduct the comparison.

Next at block 508, first remote storage 20 forwards to second remote storage 30 those writes missing from second remote storage 30, as determined by the comparison of sidefiles 22 and 32. Finally at block 510, once the writes at second remote storage 30 is up to date, normal communication (e.g., a synchronous forwarding of writes) between first remote storage 20 and second remote storage 30 may commence, and the information in sidefiles 22 and 32 can be purged. Alternatively, normal communication between first and second remote storages 20 and 30 could be asynchronous. But second remote storage 30 will typically be located far enough from first remote storage 20 that synchronous communication is rendered impractical.

In the case of synchronous communications between storages 20 and 30, writes from host 5 to first remote storage 20 is blocked until normal synchronous mirroring is reestablished between storages 20 and 30. In that case, after block 510 is accomplished, first remote storage 20 (which had blocked host-writes) can resume normal host traffic and replication. In the case of asynchronous communication between storages 20 and 30, first remote storage 20 does not need to block host-writes, but instead would buffer them in sidefile 22 for forwarding to second remote storage 30 after normal replicating communications are established.

Next, the sizing of sidefiles 12, 22 and 32 will be discussed. Ideally, the maximum contiguous write missing from sidefile 32 will be present (or, in other words, will not be older than the maximum contiguous write in sidefile 22). If a write that is missing from sidefile 32 is also no longer present in sidefile 22, then it would be necessary to make a full copy of the data on first remote storage 20 to second remote storage 30, which defeats the purposes of providing sidefiles 22 and 32. For example (in terms of the example field values of FIG. 2), if the oldest contiguous sequence number in sidefile 22 was 5 (instead of 1 as depicted), then sequence number 4 (which, as noted above, is the sequence number needed to update second remote storage 30) would not be present in sidefile 22, hence there would be no way to update second remote storage 30 merely by forwarding writes from first remote storage 20 to second remote storage 30.

The size of sidefile 22 needs to be sufficiently large so that the oldest sequence number in sidefile 32 is assured to be available in sidefile 22. This consideration will typically be balanced against the costs of maintaining an extremely large sidefile.

According to at least one embodiment of the present invention, a fixed number of writes (or storage capacity) to be stored in sidefile 32 can be determined in advance based upon an estimate of how far behind in terms of writes (and the size of the writes) second remote storage 30 is anticipated to lag first remote storage 20. Then, correspondingly, sidefiles 12 and 22 should be configured to hold a larger number of writes, in particular, larger by a margin sufficient to ensure that the oldest sequence number missing in sidefile 32 is assured to be available in sidefile 22. In this embodiment, fields 47 and 48 of sidefile 12 and field 58 of sidefile 22 are not needed, which eliminates the computational overhead of having to update the tracking in these fields.

An alternative technique for sizing sidefiles 12 and 22, accordingly to at least one embodiment of the present invention, will now be discussed. Instead of blindly overwriting the oldest write with each new (or, in other words, the youngest) write in order to maintain a fixed number of writes in the sidefile, the number of writes stored in sidefiles 12 and 22 can be adaptively adjusted in an ongoing manner relative to the maximum contiguous sequence number known to be in sidefile 32. If each of sidefiles 12 and 12 represents a dedicated part of a volatile memory (e.g., a non-flash semiconductor memory) and a remaining portion of that memory is used as random access memory for a processor that forms a part of the hardware of primary storage 10 and first remote storage 20, respectively, then adaptively adjusting the number of writes stored in sidefiles 12 and 22 additionally represents a technique to minimize the portion of the respective memory consumed by maintaining sidefiles 12 and 22. Also, adaptively adjusting the number of writes stored in sidefiles 12 and 22 can accommodate unusual circumstances in which second remote storage 30 lags (in terms of writes) first remote storage 20 by a much greater extent than would have been anticipated by the embodiment which stores a fixed number of writes in each of sidefiles 12 and 22.

Primary storage 10 is responsible for determining the maximum contiguous sequence number in sidefile 32. To do so, primary storage 10 polls or sends out a checkpoint to second remote storage 30. Upon receiving the reply, primary storage node 10 forwards this information to first remote storage node 20. First remote storage node 20 can then discard writes older than and including the maximum contiguous sequence number in sidefile 32.

Figure 5:
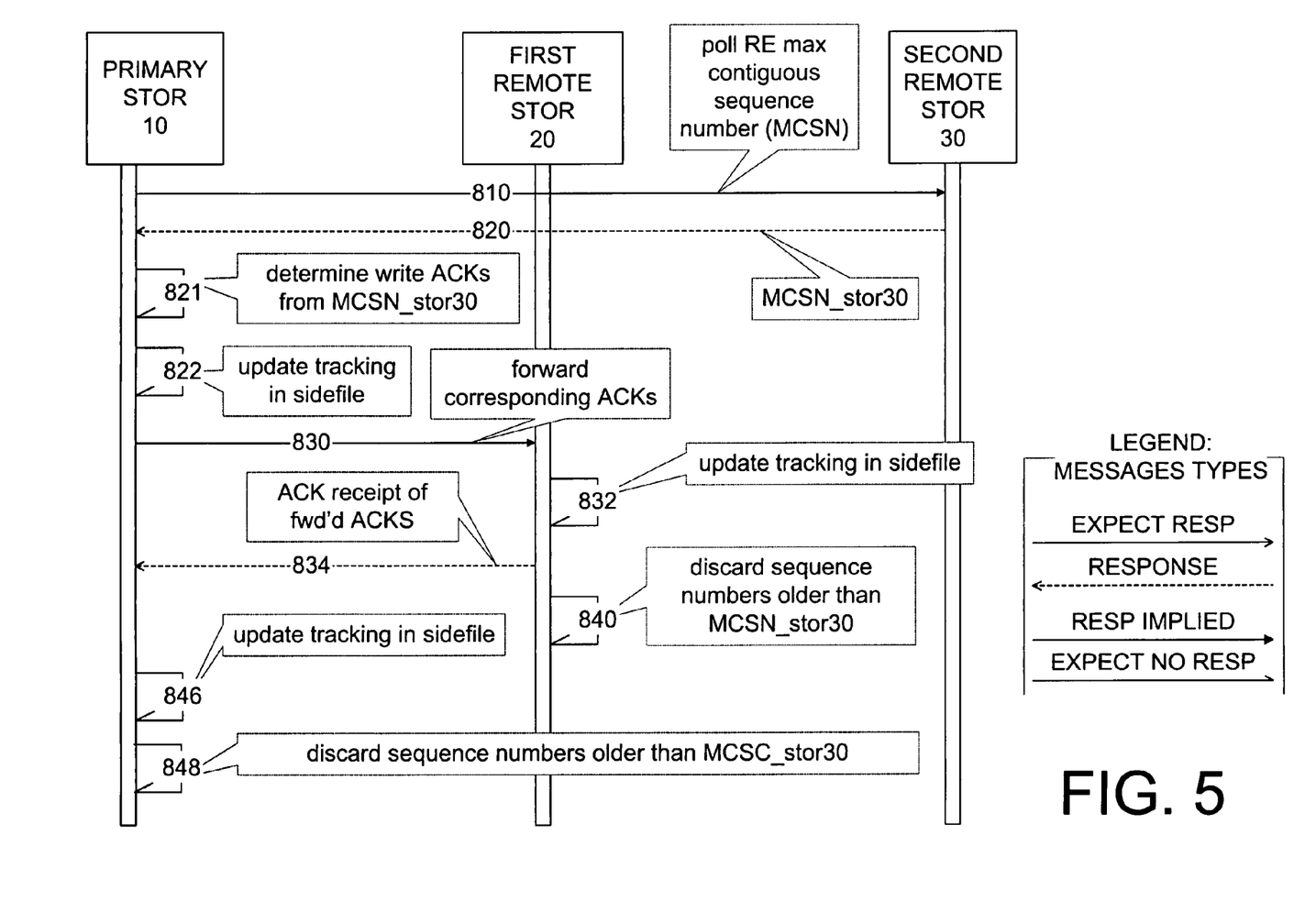
FIG. 5 is a UML-type sequence diagram illustrating an example method for adaptively adjusting the number of writes retained in a sidefile, according to at least one embodiment of the present invention. In a sequence diagram, ⟶indicates an action that expects a response message. A ⟵ indicates a response message. A ⟶indicates an action for which the response is implied. And a ⟶indicates an action for which no response is expected.

FIG. 5 is a UML sequence-type diagram illustrating an example method for adaptively adjusting the number of writes stored in a sidefile, according to at least one embodiment of present invention. At message 810, primary storage 10 polls second remote storage 30 to determine the maximum contiguous sequence number in sidefile 32 (referred to as MCSN_stor30 in FIG. 5). At message 820, primary storage 10 receives a reply from second remote storage 30 containing MCSN_stor30.

At self-message 821 (or, in other words, message 821 is sent to itself), primary storage 10 determines from MCSN_stor30 which writes, in effect, are being acknowledged by second remote storage relative to the previous instance of receiving MCSN_stor30. Then at self-message 821, primary storage updates the tracking in field 47 of sidefile 12 regarding such acknowledgements (ACKs).

At message 830, primary storage 10 forwards to first remote storage 20 an indication of the ACKs corresponding to MCSN_stor30. At self-message 832, first remote storage 20 updates the tracking in field 58 of sidefile 22 regarding such acknowledgements (ACKs). At message 834, first remote storage 20 sends an ACK as to having received the forwarded-ACKs. At self-message 840, first remote storage 20 discards those sequence numbers in sidefile 22 that are equal to or older than MCSN_stor30.

At self-message 846, primary storage 10 updates the tracking in field 48 of ACKs regarding forwarded ACKs. At self-message 848, primary storage 10 discards those sequence numbers in sidefile 12 that are equal to or older than MCSN_stor30. Alternatively, one or both of self-messages 846 and 848 can occur before self-message 840.

As it is readily understood by those of ordinary skill in art, although embodiments of present invention have been described having a finite number of primary storage entities and remote storage entities, such cannot be construed as being limiting of present invention. To contrary, a host and/or primary storage entity may be connected to an unlimited number of remote storage entities. That is, as long as processing capability of specific entities involved is sufficient, a significant number of remote storage entities may be implemented.

For example, additional remote storage entities can be added to arrangement 1. The additional remote storage entities can correspond in manner of connection and behavior to second remote storage 30 prior to a failure of primary storage 10. Accordingly, sidefile 12 can be expanded to include additional fields 47', 47", . . . corresponding to the additional (third, fourth, . . . ) remote storage entities, respectively. Via fields 47', 47", etc., write-currency of the additional remote storage entities can be tracked.

In addition, although various host, primary and remote entities are shown as being in direct communication with one another, it is clear that indirect communication between various entities may also be used. That is, indirect routing of data signals, via intermediaries, between various entities may be used if desired and if such is found practical due to implementation constraints and/or design requirements.

Embodiments of present invention being thus described, it will be obvious that same may be varied in many ways. Such variations are not to be regarded as a departure from spirit and scope of present invention, and all such modifications as would be obvious to one skilled in art are intended to be included within its scope.

What is claimed:

1. A data synchronization method for a redundant data storage arrangement in which there are at least a primary storage entity and mirroring first and second remote storage entities in communication therewith, respectively, writes to the first and second remote storage entities being tracked via respective first and second sidefiles, the first and second storage entities having different levels of write-currency relative to each other, the method comprising:

polling the second storage entity by the primary storage entity to determine an newest contiguous sequence number of the second sidefile;

generating acknowledgment information based on the newest contiguous sequence number of the second sidefile;

sending the acknowledgment information from the primary storage entity to the first remote storage entity;

discarding at least some of the sequence numbers from the first sidefile that are equal to or older than the newest contiguous sequence number, based on the acknowledgment information;

comparing sequence numbers in the first sidefile with sequence numbers in the second sidefile; and updating writes stored at the second remote storage entity based upon the comparison.

2. The method of claim 1, wherein the updating of writes includes forwarding to the second remote storage entity writes that are present in the first sidefile but not yet present in the second sidefile.

3. The method of claim 1, further comprising:
establishing a communication connection between the first and second remote storage entities in response to the primary storage entity becoming inoperative;
wherein the comparing and updating are also performed in response to the primary storage entity becoming inoperative.

4. The method of claim 1, further comprising:
configuring the first and second sidefiles to store a fixed number of writes therein, respectively; and
adding a new write to the first and second sidefiles by overwriting the oldest write therein, respectively.

5. The method of claim 1, further comprising:
adaptively adjusting the number of writes that can be stored in the first sidefile.

6. The method of claim 5, wherein the adaptive adjustment is based upon the writes that are stored in the second sidefile.

7. The method of claim 6, wherein the adaptive adjustment more particularly is based upon the write stored in the second sidefile which has the oldest contiguous sequence number.

8. The method of claim 6, further comprising:
identifying at least some of the writes stored in the second sidefile; and then accordingly informing the first remote storage entity regarding such identities.

9. The method of claim 1, further comprising:
configuring the first sidefile to include a field that is used to track whether a write has been acknowledged by the second remote storage entity as having been received.

10. The method of claim 1, further comprising:
providing a third sidefile via which writes received thereby are tracked; and
configuring the third sidefile to include a field that is used to track whether a write has been acknowledged by the second remote storage entity as having been received.

11. The method of claim 10, further comprising:
configuring the third sidefile further to include a field that is used to track whether a write-acknowledgement forwarded from the second remote storage entity has been acknowledged as having been received by the first remote storage entity.

12. A redundant data storage arrangement comprising:
a primary storage entity configured to forward writes to each of a mirroring first and second remote storage entity, the first and second storage entities having different levels of write-currency relative to each other;
the mirroring first remote storage entity, which includes a first sidefile via which writes forwarded from the primary storage entity are tracked; and
the mirroring second remote storage entity, which includes a second sidefile via which writes forwarded from the primary storage entity are tracked;
wherein the primary storage entity is configured to poll the mirroring second remote storage entity to determine a newest contiguous sequence number of the second sidefile, generate acknowledgment information based on the newest contiguous sequence number of the second sidefile, and send the acknowledgment information to the mirroring first remote storage entity;
wherein the mirroring first remote storage entity is configured to discard at least some of the sequence numbers from the first sidefile that are equal to or older than the newest contiguous sequence number, based on the acknowledgment information;
an initiating one of the first and second remote storage entities being operable to compare sequence numbers in the first and second sidefiles and invoke an updating of writes stored at the second remote storage entity based upon the comparison.

13. The redundant data storage arrangement of claim 12, wherein the updating is performed by the first remote storage entity, which is operable to do so by forwarding to the second remote storage entity writes that are present in the first sidefile but not yet present in the second sidefile.

14. The redundant data storage arrangement of claim 12, wherein each of the first and second remote storage entities is operable to
preserve in the respective sidefile sequence numbers associated with the writes; and
sort the respective sidefile according to the sequence numbers.

15. The redundant data storage arrangement of claim 12, wherein:
the initiating one is further operable to establish a communication connection between itself and the other remote storage entity in response to the primary storage entity becoming inoperative; and
the comparison and the update are performed in response to the primary storage entity becoming inoperative.

16. The redundant data storage arrangement of claim 12, wherein the first remote storage entity is closer in proximity to the primary storage entity than the second remote storage entity.

17. The redundant data storage arrangement of claim 12, wherein:
the first and second sidefiles are configured to store a fixed number of writes therein, respectively; and
the first and second remote storage entities are operable to add a new write to the first and second sidefiles by overwriting the oldest write therein, respectively.

18. The redundant data storage arrangement of claim 12, wherein:
the first remote storage entity is operable to adaptively adjust the number of writes that can be stored in the first sidefile.

19. The redundant data storage arrangement of claim 18, wherein the adaptive adjustment is based upon the writes are stored in the second sidefile.

20. The redundant data storage arrangement of claim 19, wherein the adaptive adjustment more particularly is based upon the write stored in the second sidefile which has the newest contiguous sequence number.

21. The redundant data storage arrangement of claim 19, wherein:
the primary storage entity is operable to identify at least some of the writes stored in the second sidefile and then accordingly inform the first remote storage entity regarding such identities.

22. The redundant data storage arrangement of claim 12, wherein:
the first sidefile includes a field that is used to track whether a write has been acknowledged by the second remote storage entity as having been received.

23. The redundant data storage arrangement of claim 12, wherein:
the primary storage entity includes a third sidefile to track writes received thereby;
the first sidefile including a field that is used to track whether a write has been acknowledged by the second remote storage entity as having been received.

24. The redundant data storage arrangement of claim 23, wherein the first sidefile further includes a field that is used to track whether a write-acknowledgement forwarded from the second remote storage entity has been acknowledged as having been received by the first remote storage entity.

25. The redundant data storage arrangement of claim 12, wherein each of the first and second remote storage entities represents a tracked write in the first and second sidefile, respectively, with: location information as to where on a physical medium the write is to be performed; actual data associated with the write that is to be written to the physical medium; and a sequence number uniquely associated with the write.

26. The redundant data storage arrangement of claim 12, wherein:
the first remote storage entity receives writes forwarded synchronously from the primary storage entity; and
the second remote storage entity receives writes forwarded asynchronously from the primary storage entity.

27. A data synchronization method for a redundant data storage arrangement in which there are at least a primary storage entity and mirroring first and second remote storage entities in communication therewith, respectively, the method comprising:
synchronously receiving writes at the first remote storage entity that have been forwarded from the primary storage entity;
maintaining a first sidefile via which are tracked items that include sequence numbers assigned to writes, writes received at the first remote storage entity, and writes received at the second remote storage entity;
receiving acknowledgements from the primary storage entity, the acknowledgements indicating a newest contiguous sequence number of a second sidefile maintained by the mirroring second remote storage entity,
discarding at least some of the sequence numbers from the first sidefile that are equal to or older than the newest contiguous sequence number of the second side file; and
comparing the sequence numbers at the first remote storage entity to determine whether to update writes stored at the second remote storage entity after a failure of the primary storage entity.

28. A mirroring first remote storage entity for a redundant data storage arrangement in which there are at least the first remote storage entity and a primary storage entity in communication therewith, and a mirroring second remote storage entity in communication with the primary storage entity, respectively, the first remote storage entity comprising:
memory to store data; and
a processor operable to:
synchronously receive writes that have been forwarded from the primary storage entity;
maintain a first sidefile in the memory via which are tracked items that include sequence numbers assigned to writes, writes received at the first remote storage entity, and writes received at the second remote storage entity;
receive acknowledgements from the second remote storage entity, the acknowledgements indicating a newest contiguous sequence number of a second sidefile maintained by the mirroring second remote storage entity,
discard at least some of the sequence numbers from the first sidefile that are equal to or older than the newest contiguous sequence number of the second side file; and
compare the sequence numbers at the first remote storage entity to determine whether to update writes stored at the second remote storage entity after a failure of the primary storage entity.

\* \* \* \* \*